(12) United States Patent
Chen et al.

(10) Patent No.: US 6,956,918 B2
(45) Date of Patent: Oct. 18, 2005

(54) METHOD FOR BI-DIRECTIONAL DATA SYNCHRONIZATION BETWEEN DIFFERENT CLOCK FREQUENCIES

(75) Inventors: Wenliang Chen, Portland, OR (US); Uddalak Bhattacharya, Tigard, OR (US)

(73) Assignee: Intel Corporation, Santa Clara, CA (US)

(*) Notice: Subject to any disclaimer, the term of this patent is extended or adjusted under 35 U.S.C. 154(b) by 710 days.

(21) Appl. No.: 09/894,024

(22) Filed: Jun. 27, 2001

(65) Prior Publication Data

US 2003/0002606 A1 Jan. 2, 2003

(51) Int. Cl.⁷ ................................................ H04L 7/00
(52) U.S. Cl. ...................... 375/354; 375/359; 375/355; 370/359; 370/204
(58) Field of Search ................................ 375/354, 359, 375/355; 370/359, 204; 713/501

(56) References Cited

U.S. PATENT DOCUMENTS 5,422,914 A  6/1995  Snyder 5,680,594 A * 10/1997 Charneski et al. .......... 713/501

* cited by examiner

Primary Examiner—Shuwang Liu
Assistant Examiner—Eva Zheng
(74) Attorney, Agent, or Firm—Blakely, Sokoloff, Taylor & Zafman LLP

(57) ABSTRACT

A method for bi-directional data synchronization between different clock frequencies is described wherein a state machine counter is provided a first clock signal having a first frequency. The state machine counter is then provided a second clock signal having a second frequency that is an integer multiple of the first clock frequency. The state machine counter has an integer number of states equivalent to the ratio of the second clock signal frequency to the first clock signal frequency. The first clock signal is applied to reset the state machine counter to an initial state. The state machine counter generates an intermediate clock signal whenever the state machine increments through all states to return to the initial state. The intermediate clock is then applied to synchronize data between the first clock frequency and the second clock frequency.

30 Claims, 8 Drawing Sheets

METHOD FOR BI-DIRECTIONAL DATA SYNCHRONIZATION BETWEEN DIFFERENT CLOCK FREQUENCIES

BACKGROUND OF THE INVENTION

1. Field of the Invention

The present invention relates generally to data processing systems, and in particular, relates to a data synchronization methodology for use with a data processing system.

2. Background Information

Several independent clocks running at different frequencies are often necessary within a digital system. For example, a processor may have a different clock frequency than a system bus. However, clock skew caused by phase variances between different high frequency clocks can result in hardware lock up and data errors or the inability to translate data from one clocked system to another. Clock skew between clocks of the same frequency occurs when the rising edges are not closely aligned. A common solution to clock skew in digital systems is the application of a phase-locked loop (PLL) circuit. A phase locked loop circuit reduces clock skew to levels that allow a system to function properly.

FIG. 1 illustrates a method for data synchronization between two frequency domains. Unit A is clocked using "clkl." Unit B is clocked using "clkh." Generally, "clkl" is a lower frequency than "clkh." A PLL circuit placed in a feedback loop is used to control clock skew by tightly coupling "clkl" with "clkh." Generally, the leading edges of the clocks are aligned to provide the tight coupling. Clock skew is kept near zero using the PLL method so that data transferred directly from unit A to unit B and from unit B to unit A occurs with minimal error.

A disadvantage to phase lock loops is the complexity and additional circuitry required to implement them in a digital system. Additionally, a phase locked loop is only effective when then clock frequencies can be correlated. Generally, the skew between the clocks must be small enough to still couple the leading edges with a PLL circuit. However, when clocks are distributed, clock skew increases as a consequence of distribution. Accumulated skew will eventually render data synchronization between two clocks impossible. Placing PLLs at each distribution node is one solution to skew problems with distributed clocks, but it is expensive in terms of area and harder to implement in large circuits.

Another limitation of direct data synchronization techniques, as in FIG. 1, is the inability to correlate clocks of fractional frequencies. Generally, it is a trivial matter to divide or multiply a clock by integer frequencies, but correlating data at non-integer frequency requires both clock multiplier and clock dividers. However, when clock multipliers and clock dividers are used together, the clock skew may reach levels that cannot be corrected by a PLL circuit.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for bi-directional data synchronization between clock frequencies are described herein. In the following description, numerous specific details are provided, such as the methods described in FIGS. 2–7, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Whenever possible like numbers refer to like devices throughout the drawings.

In certain embodiments of the invention instructions are stored on machine-readable media for execution by a processor. A processor may be any device or devices capable of executing the instructions such as a computer. A machine-readable medium includes any mechanism that provides information in a form readable by a machine such as a processor. For example, a machine readable medium includes read only memory (ROM); random access memory (RAM); magnetic disk storage media; optical storage media; flash memory devices; electrical, optical, acoustical or other forms of propagated signals, and the like.

In summary, a method for bi-directional data synchronization between different clock frequencies is described in detail below. A state machine counter is provided a first clock signal having a first frequency. The state machine counter is provided a second clock signal having a second frequency that is an integer multiple of the first clock frequency. The state machine counter has an integer number of states equivalent to the ratio of the second clock signal frequency to the first clock signal frequency. The first clock signal is applied to reset the state machine counter to an initial state. The state machine counter generates an intermediate clock signal whenever the state machine increments through all states to return to the initial state. The intermediate clock is then applied to synchronize data between the first clock frequency and the second clock frequency independent of clock skew.

FIGS. 2–6: Bi-Directional Data Syncronization between Different Clock Frequencies.

Figure 1:
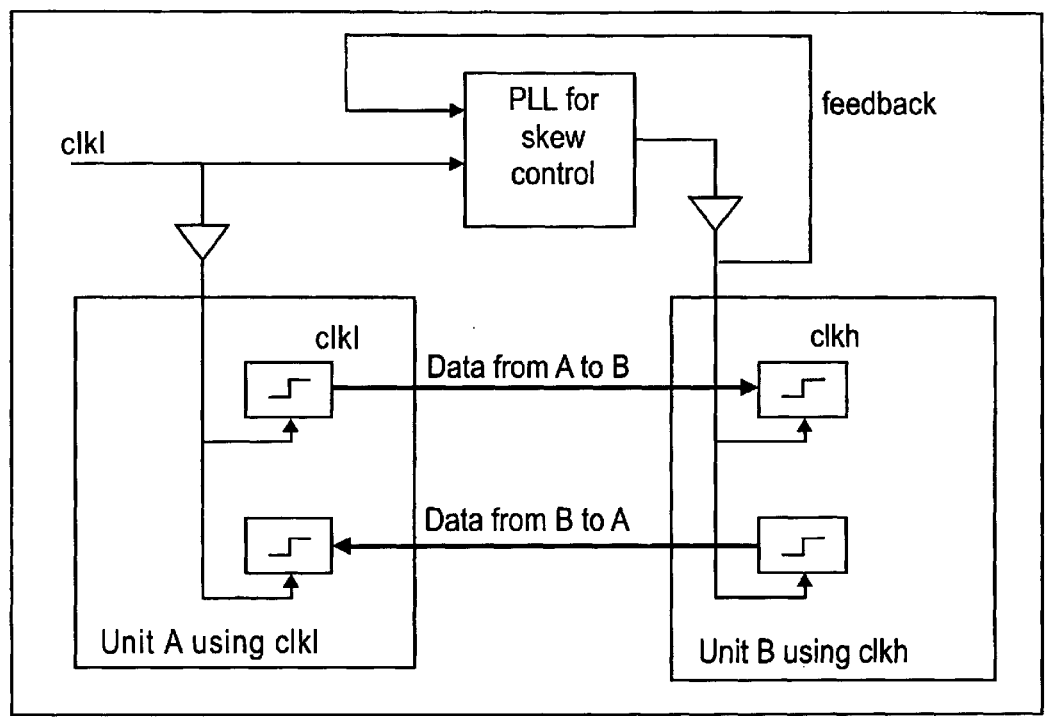
FIG. 1 illustrates a prior art method for data synchronization between two clock frequencies.
Figure 2:
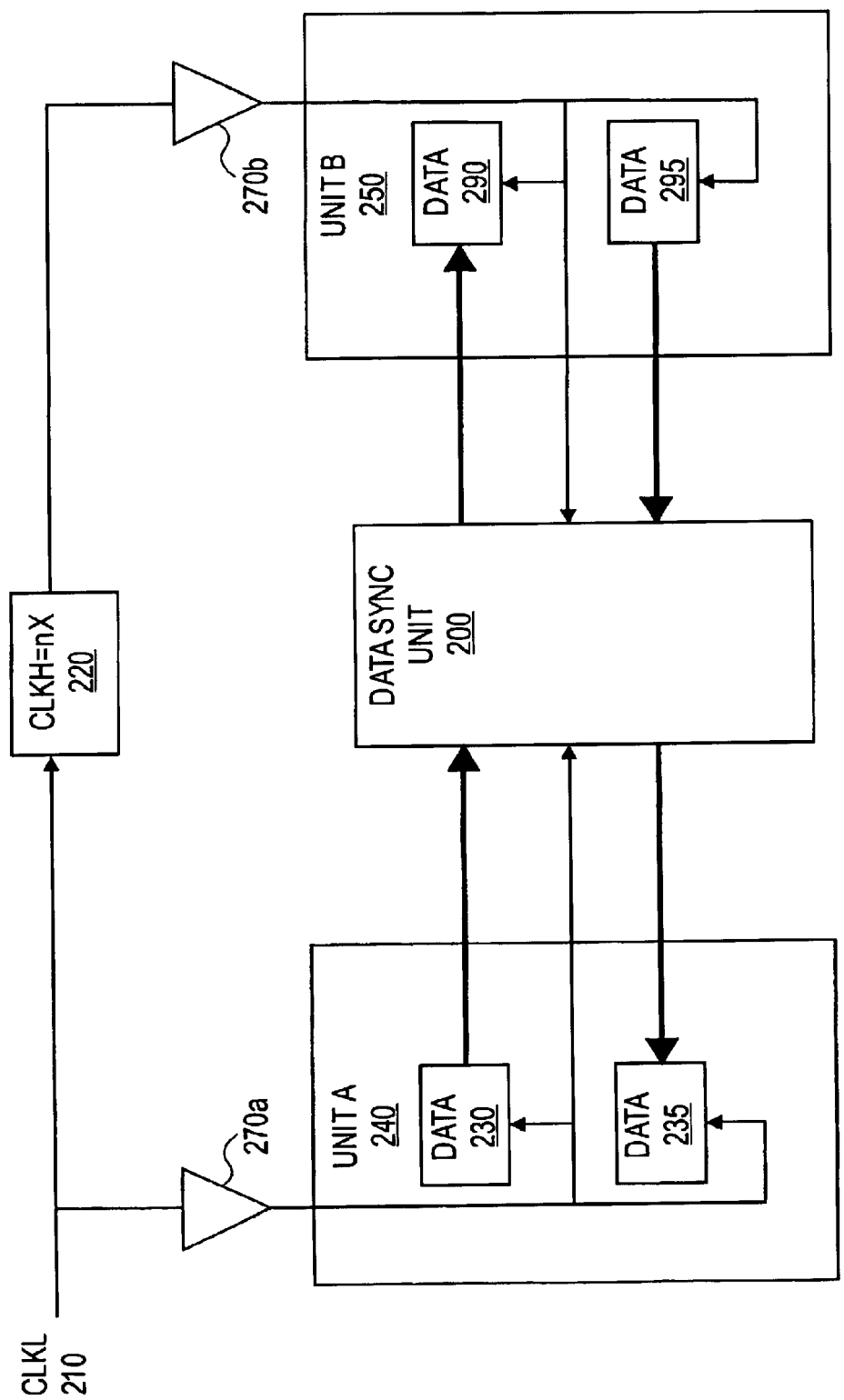
FIG. 2 illustrates a method for data synchronization between two different clock frequencies in accordance with the present invention.

FIG. 2 illustrates a method for data synchronization between two different clock frequencies in accordance with the present invention. FIG. 2 contains unit A 240. Generally, unit A 240 is a hardware device, such as a memory register or a processor for example. Unit A contains data 230 and data 235. FIG. 2 illustrates a data clock 210, CLKL 210, provided to clock driver 270a for unit A 240. The clock driver 270a provides drive power for the CLKL 210 signal.

FIG. 2 also contains unit B 250, which is generally a hardware device operating at a different clock frequency than unit A. Unit B contains data 290 and data 295 which are clocked by CLKH 220. The frequency of the CLKH 220 data clock is an integer multiple "N" of the CLKL 210 data clock frequency, such that frequency of CKLH 220 is equivalent to "N" times the frequency of CLKL 210. For example, if CLKL has a frequency of one and CLKH has a frequency of three, then "N" is equal to three. Generally, the CLKH 220 data clock is derived from the CLKL 210 data clock by a clock multiplier. Clock multipliers and dividers are known in the art and will not be discussed. However, both CLKL 210 and CLKH 220 may be derived from another clock operating at a higher frequency than either CLKL 210 or CLKH 220 by use of a clock divider. FIG. 2 illustrates CLKH 220, provided to clock driver 270b for unit B 250. The clock driver 270b provides drive power for the CLKH 220 signal.

FIG. 2 also shows a data sync unit 200 positioned between unit A 240 and unit B 250. Data sync unit 200 is generally a state machine capable to synchronize data between different clock frequencies independent of clock skew. Data sync unit 200 additionally contains hardware to provide known delay. The term "data sync" is used interchangeably with "data synchronization" throughout this specification, and is understood to have the same meaning. Data sync unit 200 may also be implemented using hardware or hardware emulation. Data sync unit 200 receives CLKL 210 and CLKH 220. FIG. 2 illustrates data 230 clocked by CLKL in unit A 240 synchronized to data 290 through data sync unit 200. Data 295 in unit B clocked by CLKH 220 is shown synchronized to data 235 in unit A clocked by CLKL 210.

Figure 3:
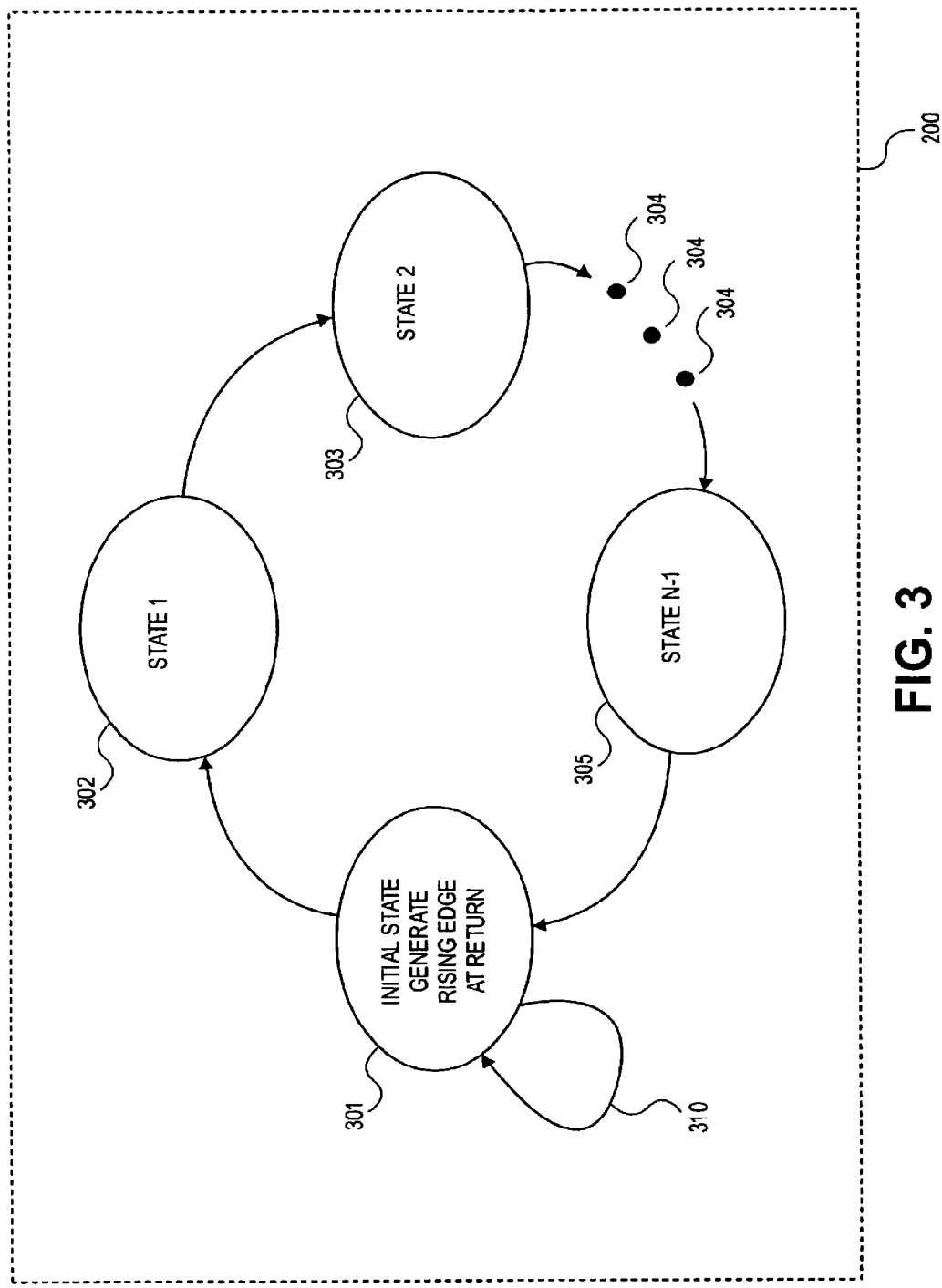
FIG. 3 illustrates a state diagram of a data synchonization unit in an example of the invention.

FIG. 3 illustrates a state diagram of a data synchonization unit 200 in an example of the invention. Data syncronization unit 200 is a state machine counter having "N" states, where "N" is an integer number coresponding to the ratio of two clock signal frequencies that are to be synchronized. A counter reset 310 allows the state machine to be set to an initial, or zero state 301, by the application of a clock signal. After the counter is reset to the initial state by a reset clock, the state machine advances one state for each cycle of an applied counter clock. Generally, two data clocks are provided to the state machine. The data clocks have different frequencies by an integer ratio. For example, in FIG. 2, CLKL 210 and CLKH 220 are provided to the data sync unit 200 to synchronize data between the two clock frequencies.

The number of states "N" of the state machine is predetermined based upon the frequency ratio of the data clocks to be synchronized. FIG. 3 shows an initial state 301, a first state 302, a second state 303, and additional states 304 up to a final state "N-1" 305. The state machine 200 generates a rising edge when changing from the final state "N-1" 305 to the intial state 301. For example, two clock signals have an integer frequency ratio of five; therefore "N" is five. The second clock has a frequency five times that of the first clock. In the present example, state machine 200 would have five states, zero through four. The first clock is applied to the counter reset 310 one time. The second clock is applied to increment the state machine through the five states. A clock rising edge is generated every time the state machine returns to the intial state, thereby creating an intermediate clock signal with a known timing relationship to both clocks. The intermediate clock signal may then be applied to synchronize data between the first and second clocks using a known delay such as a flip-flop for example even though the clocks may have arbitrary skew.

In one embodiment, the state machine may be additionally or alternatively configured to generate a rising edge at the transition to the final "N-1" state to provide a clock signal one clock period ahead of the intermediate clock signal.

Figure 4:
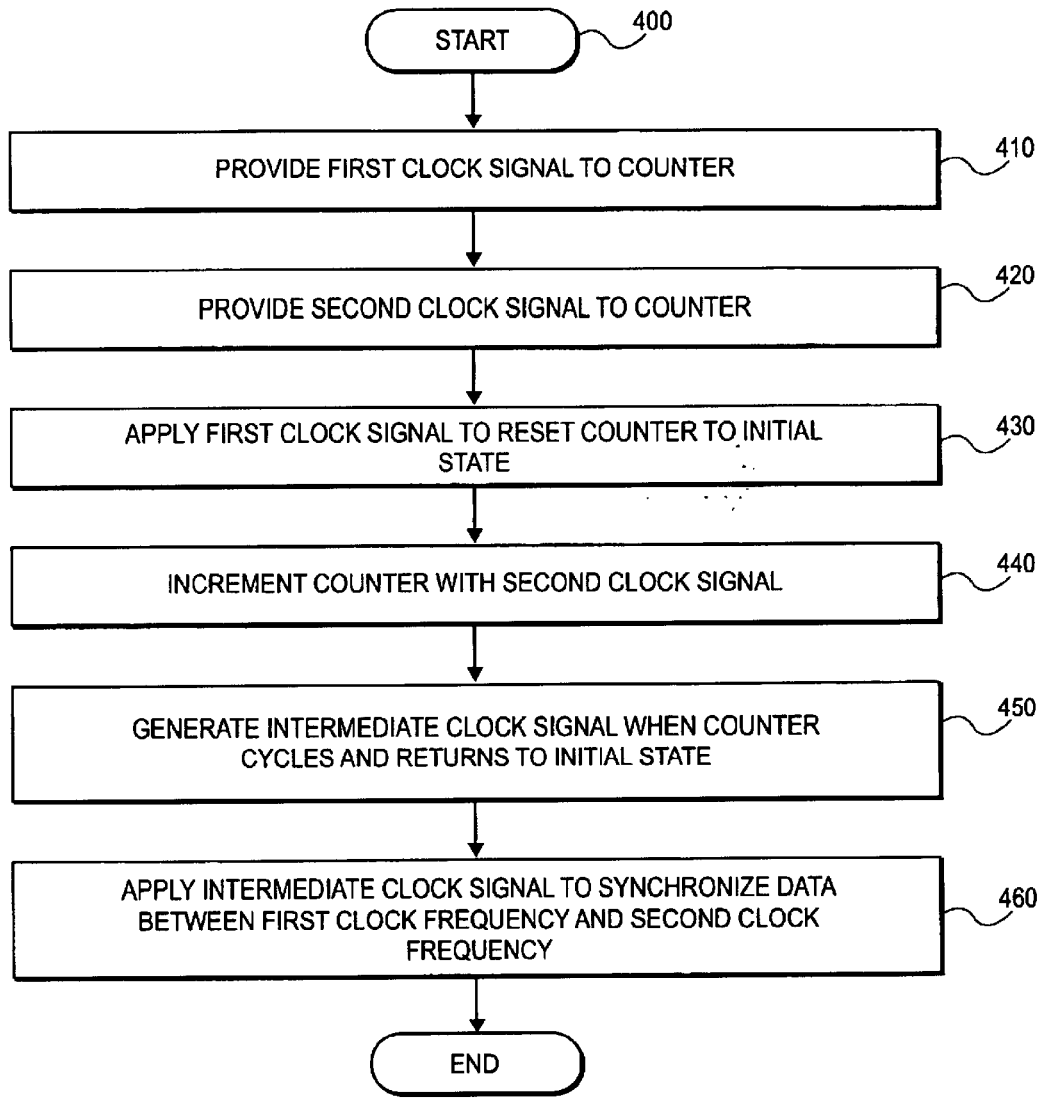
FIG. 4 is a process flow diagram of a state machine counter in an example of the invention.

FIG. 4 is a process flow diagram of a state machine counter in an example of the invention. Data at two different clock frequncies may be sychnchronized using the steps illustrated in Process 400. Process 400 begins in step 410. A first clock signal is provided to a state machine counter 200 in step 410. The first clock signal is generally a digital data clock signal such as CLKL 210 of FIG. 2. The first clock signal may be derived from a high-frequency system clock using a divider, or the clock may be derived from a clocked data-containing device. The state machine counter 200 is generally a hardware device or devices operated by instructions executed by a processor.

In step 420, a second clock signal is provided to the state machine counter. The second clock signal frequency is an integer multiple of the first clock signal frequency, and may be derived in a similar manner to the first clock signal. The first and second clock signals are automatically provided to the state machine whenever data synchronization between different frequencies is necessary.

In step 430, the first clock signal is applied to reset the state machine to an initial state. The initial state reset 310 returns the state machine to the beginning of a counting cycle. The state machine counter is reset one time by the first clock to provide a known timing relationship to the first clock signal.

In step 440, the counter is incremented with the second clock signal. The second clock signal advances the state machine counter one state for each clock period of the second clock signal. In step 450, the state machine generates an intermediate clock signal. A rising edge is generated each time the counter transistions from a final state "N-1" 305 to the intial state 301 to begin the counting cycle again. The state machine continues counting until a counter reset 310 is applied for as long as the device is operating. The intermediate clock signal created by the state machine has the frequency of the first clock signal, the timing of the second clock signal, and a known timing relationship to the first clock signal. In an embodiment, a second intermediate clock signal is generated by the generation of a rising edge for every transition to the "N-1" 305 state.

In step 460, the intermediate clock signal is applied to synchronize data between the first clock frequency and the second clock frequency. Generally, the intermediate clock signal is utilized to synchronize data at the different clock frequencies. The intermediate clock signal has the timing of the second clock signal and the frequency of the first clock signal enabling data synchronization by reclocking the data through a known delay such as a flip-flop for example. Data synchonization may occur at any time after the state machine counter is generating the intermediate clock signal. Reclocking data is understood to mean the process of applying a particular clock signal to a data signal to correlate the data signal to the specific clock signal frequency. Reclocking may be accomplished in a variety of ways, such as clocking a memory register, or through a flip-flop for example. To reclock data is to change the data frequency to the reclock frequency.

Figure 5:
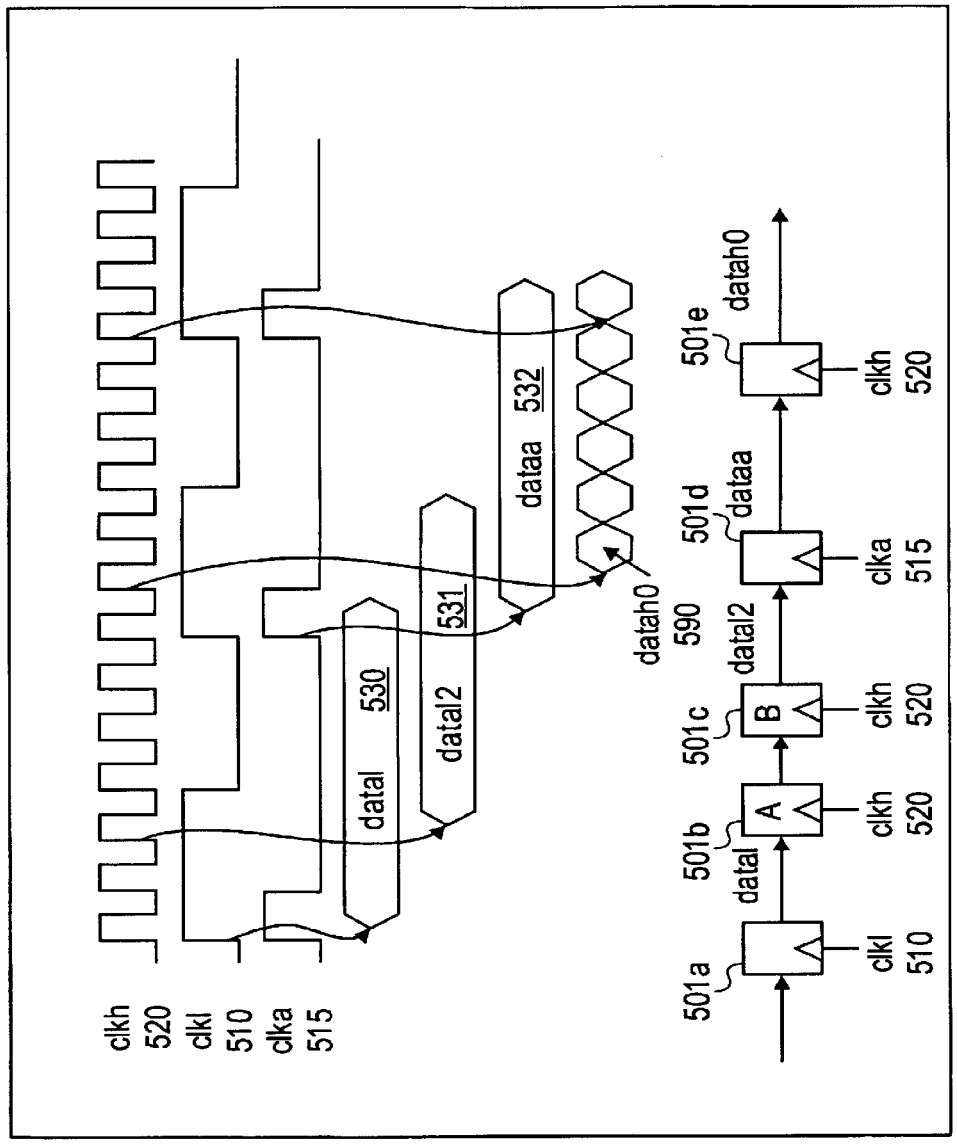
FIG. 5 illustrates a timing diagram and method for data synchronization in an example of the invention.

FIG. 5 illustrates a timing diagram and method for data synchronization in an example of the invention. FIG. 5 contains a timing diagram illustrating three clock signals CLKL 510, CLKH 520 and CLKA 515. Clock signal CLKH 520 has a frequency that is an integer multiple of CLKL 510. As illustrated, CLKA 515 has the same frequency as CLKL 510, but the same positive duty cycle as the period of CLKH 520. Generally, CLKA 515 is generated by data sync unit such as data sync unit 200 of FIG. 2. FIG. 5 depicts CLKL 510 and CLKH 520 with rising edges aligned. However, there may be arbitrary skew between CLKL 510 and CLKH 520.

FIG. 5 illustrates data synchronization from CLKL 510 to CLKH 520. A data bit is clocked by CLKL 510 to produce DATAL 530. Generally, DATAL 530 is provided by a device such as unit A 240 of FIG. 2. DATAL 530 is delayed by two cycles of CLKH 520 through flip-flops 501b and 501c to produce DATAL2. The delay provided by flip-flops 501b and 501c is a known delay that removes any timing uncertainty that could arise from clock skew between CLKL 510 and CLKA 515. The delayed data DATAL2 is then provided to a flip-flop 501d clocked by the intermediate clock signal CLKA 515, to create DATAA 532. Finally, DATAA 532 is provided to another flip-flop 501e clocked by CLKH 520. Clock CLKA 515, and clock CLKH 520 have a known timing relationship so no further steps are necessary and synchronization of data from CLKL 510 to CLKH 520 is complete. Any manner of providing a known delay may substitute for a flip-flop. Generally, the synchronization of data from CLKL 510 to CLKH 520 occurs automatically whenever a data sync unit 200 is operational.

Figure 6:
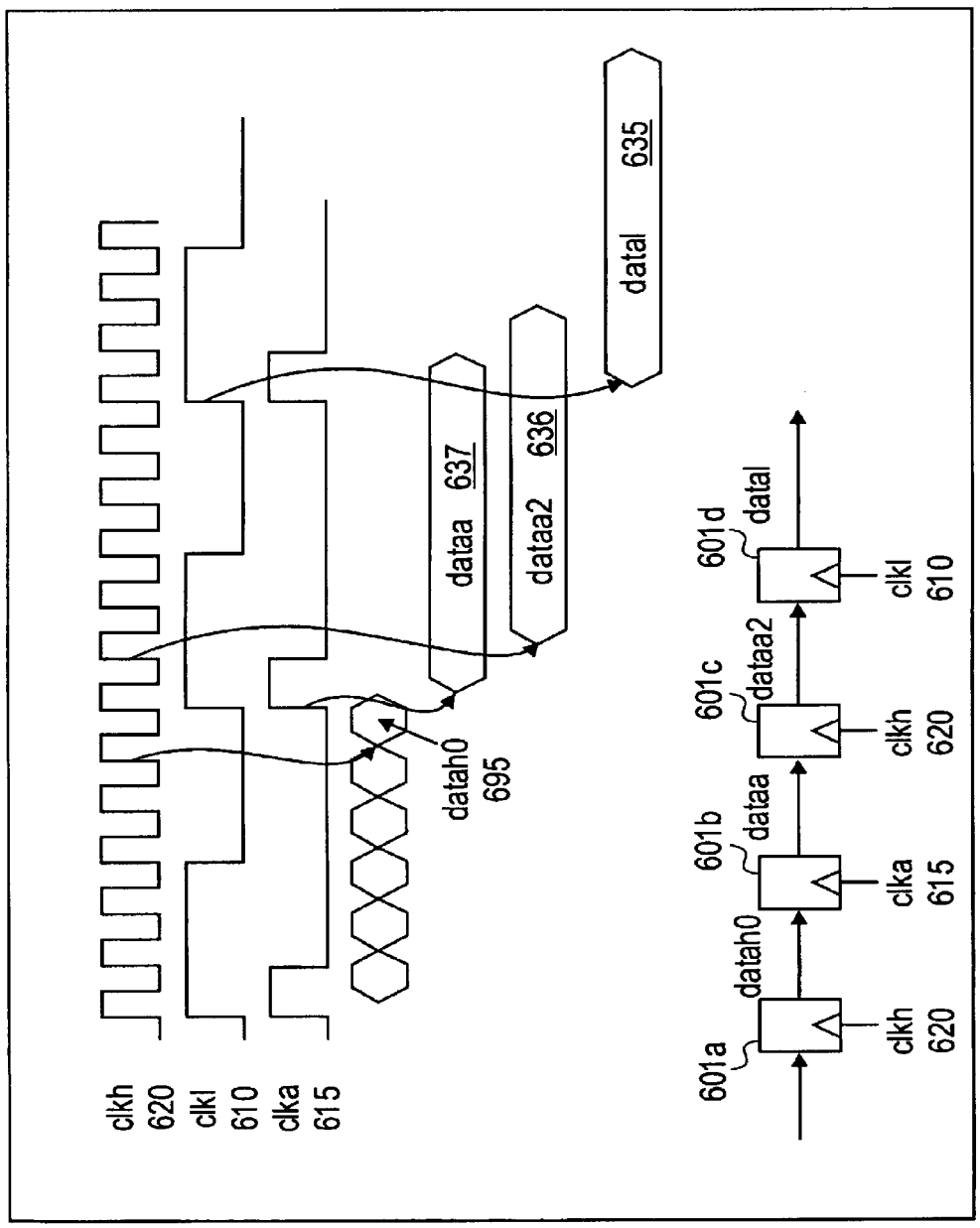
FIG. 6 illustrates a second diagram and method for data synchronization in an example of the invention.

FIG. 6 illustrates a second diagram and method for data synchronization in an example of the invention. FIG. 6 contains a timing diagram illustrating three clock signals CLKL 610, CLKH 620 and CLKA 615. Clock signal CLKH 620 has a frequency that is an integer multiple of CLKL 610. As illustrated, CLKA 615 has the same frequency as CLKL 610 but the timing relationship of CLKH 620. FIG. 6 depicts CLKL 610 and CLKH 620 with rising edges aligned. However, there may be arbitrary skew between CLKL 610 and CLKH 620.

FIG. 6 illustrates data synchronization from CLKH 610 to CLKL 620. A data bit is clocked by CLKH 620 to produce DATAH0 695. Generally, DATAH0 is provided by a device such as unit B 250 of FIG. 2. DATAH0 695 is provided to a flip-flop 601b clocked by the intermediate clock, CLKLA 615, to produce DATAA 637. To remove uncertainty due to possible clock slew, DATAA is delayed by one cycle of CLKH 620 through flip-flop 601c to produce DATAA2 636. Providing DATAA2 to flip-flop 601 clocked by CLKL 610 produces DATAL 635. Synchronization of data from CLKH 620 to CLKL 610 is complete.

Any manner of providing a known delay may be utilized to substitute for a flip-flop. Generally, the synchronization of data from CLKH 620 to CLKL 610 occurs automatically whenever a data sync unit 200 is operational. Generally, the methods of FIGS. 5 and 6 are combined to provide bi-directional data synchronization as in data synchronization unit 200 of FIG. 2. However, the methods may be used separately or in concert depending on the application.

Figure 7:
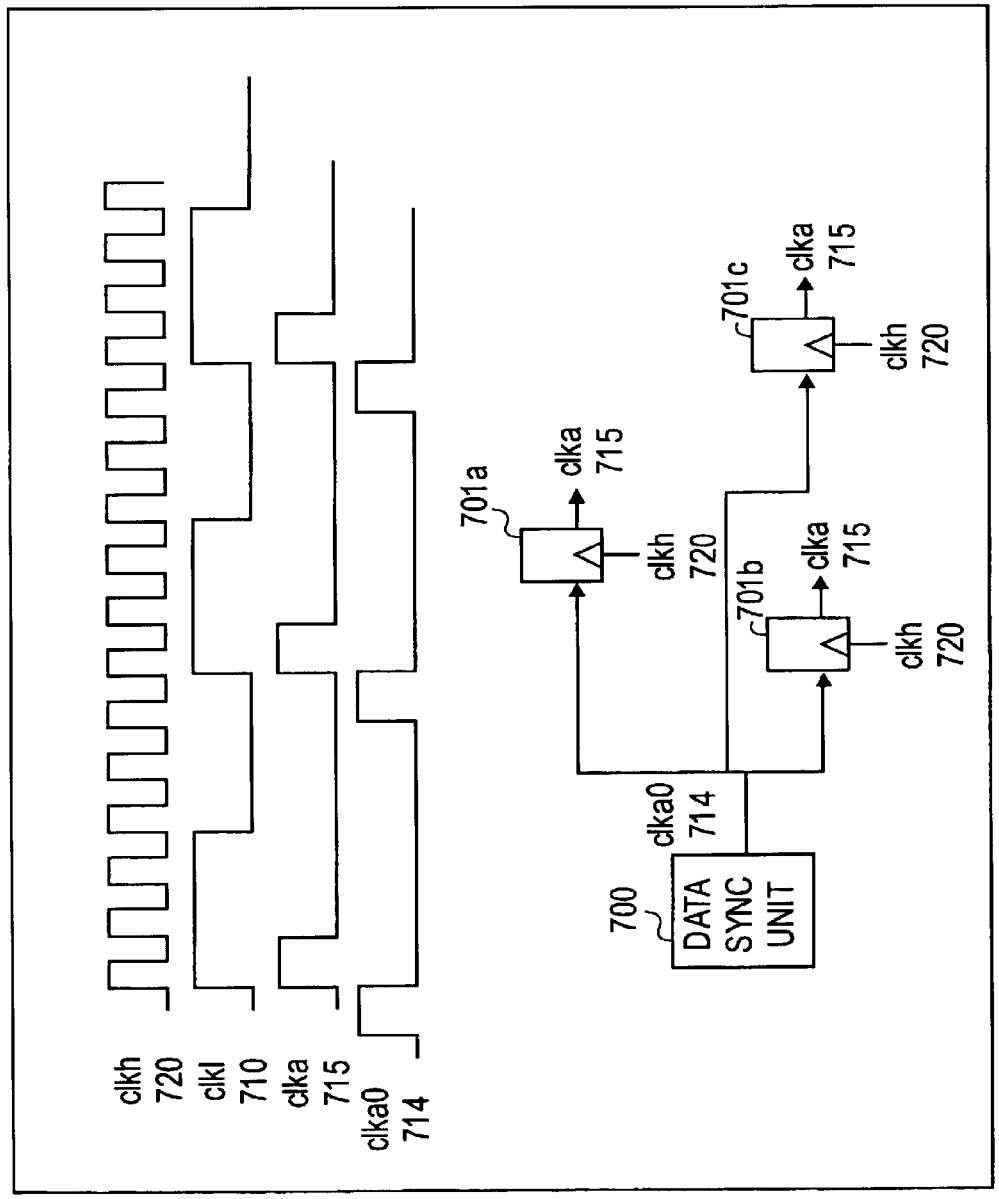
FIG. 7 illustrates a timing diagram and method for distributing a clock signal in an example of the invention.

FIG. 7: Distribution of a Clock Signal for Synchronization.

FIG. 7 illustrates a timing diagram and method for distributing a clock signal in an example of the invention. FIG. 7 contains a timing diagram illustrating four clock signals CLKL 710, CLKH 720 and CLKA 715 and CLKA0 714. Clock signal CLKH 720 has a frequency that is an integer multiple of CLKL 710. As illustrated, CLKA 715 has the same frequency as CLKL 710 but the timing relationship of CLKH 720. FIG. 7 depicts CLKL 710 and CLKH 720 with rising edges aligned. However, there may be arbitrary skew between CLKL 710 and CLKH 720. FIG. 7 depicts a precursor clock CLKA0 714, which is CLKA 715 stepped ahead by one clock period.

FIG. 7 shows a data sync unit 700. Data sync unit 700 produces CLKA0 714. The CLKA0 714 signal is distributed to different geographic regions of a device such as a processor for example. FIG. 7 shows flip-flop 701a, flip-flop 701b, and flip-flop 701c at different locations. The distributed precursor clock CLKA0 714 is latched by a local CLKH 720 though a flip-flop, such as flip-flops 701a, 701b or 701c for example, to produce CLKA 715. Each geographic location where the CLKA0 714 clock is provided will generate the same CLKA 720, allowing easier data synchronization between different geographic regions with fewer timing jitter or clock skew problems.

Figure 8:
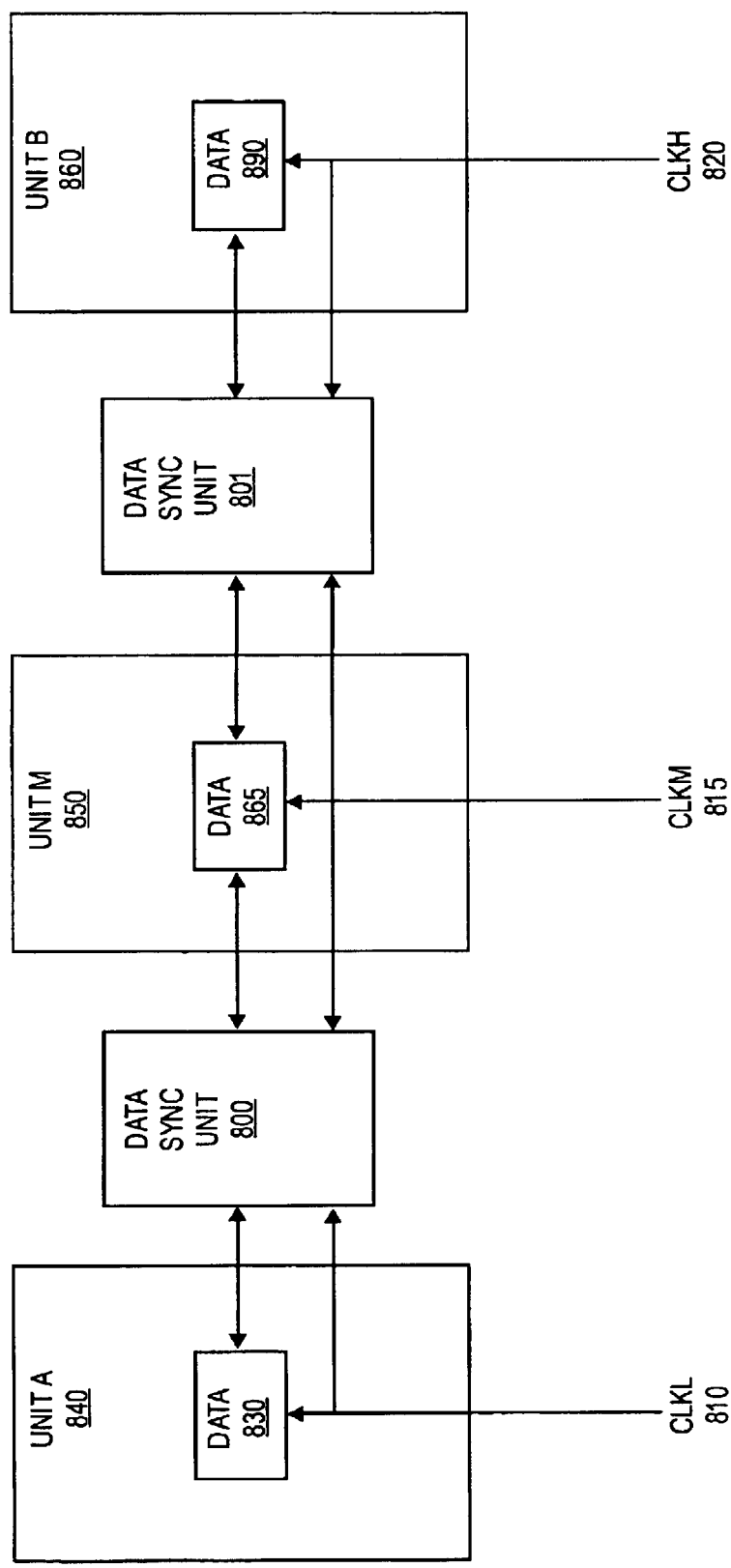
FIG. 8 illustrates a method for data synchronization between fractional clock frequencies.

FIG. 8: Bi-Directional Data Syncronization between Fractional Clock Frequencies

The methods of FIGS. 2–6 may be extended to provide bidirectional data synchronization between non-integer clock frequencies.

FIG. 8 illustrates a method for data synchronization between fractional clock frequencies. FIG. 8 contains unit A 840. Generally, unit A 840 is a hardware device, such as a memory register or a processor for example. Unit A contains data 830. FIG. 8 illustrates a data clock, CLKL 810, provided to unit A 840.

FIG. 8 contains unit B 860, which is generally a hardware device operating at a fractional clock frequency to unit A. Unit B contains data 890 clocked by CLKH 820. The frequency of the CLKH 820 data clock is a fractional multiple of the CLKL 810 data clock frequency, such that CLKH 820 is equivalent to an integer "X" times CLKL 810 divided by an integer "Y."

FIG. 8 also contains unit M 860, which is a hardware or software device operating at a fractional clock frequency to unit A. Unit M is introduced to provide a bridge between non-integer clock frequencies. Unit M contains data 860 clocked by CLKM 815. The frequency of the CLKM 815 data clock is selected to be a fractional multiple of the CLKL 810 data clock frequency, such that CLKM 815 is equivalent to CLKL 810 divided by the integer "Y."

FIG. 8 shows data sync unit 800 positioned between unit A 840 and unit M 850. Data sync unit 800 is generally a state machine capable to synchronize data between different clock frequencies independent of clock skew. Data sync unit 800 additionally contains hardware to provide known delay. Data sync unit 800 receives CLKL 810 and CLKM 815. FIG. 8 illustrates data 830 clocked by CLKL 810 in unit A 840 synchronized to data 865 through data sync unit 800. Data sync unit 800 is operationally identical to data sync unit 200 of FIG. 2.

FIG. 8 shows a second data sync unit 801 positioned between unit B 860 and unit M 850. Data sync unit 801 is generally a state machine capable to synchronize data between different clock frequencies independent of clock skew. Data sync unit 801 additionally contains hardware to provide known delay. Data sync unit 801 may be implemented in software or hardware. Data sync unit 801 receives CLKH 820 and CLKM 815. FIG. 8 illustrates data 865 clocked by CLKM 810 in unit M 850 synchronized to data 890 in Unit B 860 through data sync unit 801. Data sync unit 801 is operationally identical to data sync unit 800.

Data may be synchronized between unit A 840 operating at the CLKL 810 frequency and unit B 860 operating at the CLKH 820 frequency through unit M 850 and data sync units 800 and 801. Data in unit A 840 is first synchronized to unit M using the data sync unit 800 by application of the methods and apparatus described in FIGS. 2–6. A second data synchronization between unit M 850 and unit B 860 using the methods and apparatus described in FIGS. 2–6 completes the data synchronization between unit A 840 and unit B 860. The methods described in FIGS. 2–6 allow bidirectional data synchronization and apply equally to the synchronization between unit A 840 and unit B 860 through unit M 850. A significant advantage of the present invention is that data synchronization completely independent of clock skew is possible between fractional clock frequencies.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:

providing a first clock signal having a first frequency to a state machine counter;

providing a second clock signal having a second frequency that is an integer multiple of the first clock frequency to the state machine counter;

applying the first clock signal to reset the state machine counter to an initial state;

incrementing the state machine counter with the second clock signal wherein the state machine counter has an integer number of states equivalent to the ratio of the second clock signal frequency to the first clock signal frequency;

generating an intermediate clock signal with the state machine counter wherein the counter produces an output signal whenever the state machine counter increments through all states to return to the initial state; and applying the intermediate clock signal to synchronize data between the first clock frequency and the second clock frequency.

2. The method of claim 1 wherein applying the intermediate clock signal to synchronize data between the first clock frequency and the second clock frequency further comprises:

delaying a data signal at the first clock frequency by two cycles of the second clock frequency;

reclocking the data signal at the first clock frequency to the intermediate clock; and reclocking the data signal at the intermediate clock to the second frequency.

3. The method of claim 1 wherein the applying the intermediate clock signal to synchronize data between the first clock frequency and the second clock frequency further comprises:

reclocking a data signal at the second clock frequency to the intermediate clock;

delaying the data signal at the intermediate clock by one cycle of the second clock frequency; and reclocking the data signal at the intermediate clock to the first clock frequency.

4. The method of claim 1 further comprising:

providing the second clock signal to a second state machine counter;

providing a third clock signal having a third frequency that is an integer fraction of the first clock frequency to the second state machine counter;

applying the second clock signal to reset the second state machine counter to an initial state;

incrementing the second state machine counter with the third clock signal wherein the second state machine counter has an integer number of states equivalent to the ratio of the second clock frequency to the third clock frequency;

generating a second intermediate clock signal with the second state machine counter wherein the second state machine counter produces an output signal whenever the state machine increments through all possible states and returns to the initial state; and applying the second intermediate clock signal to synchronize data between the second clock frequency and the third clock frequency.

5. The method of claim 4 wherein the applying the second intermediate clock signal to synchronize data between the second clock frequency and the third clock frequency further comprises:

delaying a data signal at the second clock frequency by two cycles of the third clock frequency;

reclocking the data signal at the second clock frequency to the second intermediate clock frequency; and reclocking the data signal at the second intermediate clock frequency to the third frequency.

6. The method of claim 5 wherein data at the first clock frequency is synchronized to data at the third clock frequency by first synchronizing data to the second clock frequency then synchronizing the data at the second clock frequency to the third clock frequency.

7. The method of claim 4 wherein the applying the second intermediate clock signal to synchronize data between the second clock frequency and the third clock frequency further comprises:

reclocking a data signal at the third clock frequency to the second intermediate clock;

delaying the data signal at the second intermediate clock by one cycle of the third clock frequency; and reclocking the data signal at the second intermediate frequency to the second clock frequency.

8. The method of claim 7 wherein data at the first clock frequency is synchronized to data at the third clock frequency by first synchronizing the data to the second clock frequency then synchronizing the data at the second clock frequency to the third clock frequency.

9. The method of claim 1 wherein the state machine counter generates a precursor intermediate clock signal that is one period of the second clock frequency ahead of the intermediate clock signal.

10. The method of claim 9 further comprising:
distributing the precursor intermediate clock signal to different locations;
latching the precursor intermediate clock signal to a local second clock signal to generate a distributed intermediate clock signal; and,
synchronizing data at different locations using the distributed intermediate clock signal.

11. A product comprising:
instructions to direct a processor to provide a first clock signal having a first frequency to a state machine counter, provide a second clock signal having a second frequency that is an integer multiple of the first clock frequency to the state machine counter, apply the first clock signal to reset the state machine counter to an initial state, increment the state machine counter with the second clock signal wherein the state machine counter has an integer number of states equivalent to the ratio of the second clock signal frequency to the first clock signal frequency, generate an intermediate clock signal with the state machine counter counter wherein the counter produces an output signal whenever the state machine increments through all states to return to the initial state, and, apply the intermediate clock signal to synchronize data between the first clock frequency and the second clock frequency, and;
machine readable media to store the instructions.

12. The product of claim 11 wherein the instructions to apply the intermediate clock signal to synchronize data between the first clock frequency and the second clock frequency further comprises instructions to:
delay a data signal at the first clock frequency by two cycles of the second clock frequency,
reclock the data signal at the first clock frequency to the intermediate clock, and,
reclock the data signal at the intermediate clock to the second frequency.

13. The product of claim 11 wherein the instruction to apply the intermediate clock signal to synchronize data between the first clock frequency and the second clock frequency further comprises instructions to:
reclock a data signal at the second clock frequency to the intermediate clock,
delay the data signal at the intermediate clock frequency by one cycle of the second clock frequency, and,
reclock the data signal at the intermediate clock to the first clock frequency.

14. The product of claim 11 further comprising:
instructions to provide the second clock signal to a second state machine counter, provide a third clock signal having a third frequency that is an integer fraction of the first clock frequency to the second state machine counter, apply the second clock signal to reset the second state machine counter to an initial state, increment the second state machine counter with the third clock signal wherein the second state machine counter has an integer number of states equivalent to the ratio of the second clock frequency to the third clock frequency, generate a second intermediate clock signal with the second state machine counter wherein the second state machine counter produces an output signal whenever the state machine increments through all possible states and returns to the initial state, and, apply the second intermediate clock signal to synchronize data between the second clock frequency and the third clock frequency, and;
machine readable media to store the instructions.

15. The product of claim 14 wherein the instructions to apply the second intermediate clock signal to synchronize data between the second clock frequency and the third clock frequency further comprise instructions to:
delay a data signal at the second clock frequency by two cycles of the third clock frequency;
reclock the data signal at the second clock frequency to the second intermediate clock; and
reclock the data signal at the second intermediate clock to the third frequency.

16. The product of claim 15 wherein data at the first clock frequency is synchronized to data at the third clock frequency by first synchronizing data to the second clock frequency then synchronizing the data at the second clock frequency to the third clock frequency.

17. The product of claim 14 wherein the instructions to apply the second intermediate clock signal to synchronize data between the second clock frequency and the third clock frequency further comprise instructions to:
reclock a data signal at the third clock frequency to the second intermediate clock;
delay the data signal at the second intermediate clock frequency by one cycle of the third clock frequency; and
reclock the data signal at the second intermediate clock to the second clock frequency.

18. The product of claim 17 wherein data at the first clock frequency is synchronized to data at the third clock frequency by first synchronizing the data to the second clock frequency then synchronizing the data at the second clock frequency to the third clock frequency.

19. The product of claim 11 wherein the state machine counter generates a precursor intermediate clock signal that is one period of the second clock frequency ahead of the intermediate clock signal.

20. The method of claim 19 further comprising instructions to:
distribute the precursor intermediate clock signal to different locations,
latch the precursor intermediate clock signal to a local second clock signal to generate a distributed intermediate clock signal, and,
synchronize data at different locations using the distributed intermediate clock signal, and; machine readable media to store the instructions.

21. An apparatus comprising;
a first data processing device clocked at a first frequency;
a second data processing device clocked at a second frequency that is an integer multiple of the first frequency;
instructions to direct a processor to provide a first clock signal having the first frequency to a state machine counter, provide a second clock signal having the second frequency to the state machine counter, apply the first clock signal to reset the state machine counter to an initial state, increment the state machine counter with the second clock signal wherein the state machine counter has an integer number of states equivalent to the ratio of the second clock signal frequency to the first clock signal frequency, generate an intermediate clock signal with the state machine counter wherein the counter produces an output signal whenever the state machine counter increments through all states to return to the initial state, and, apply the intermediate clock signal to synchronize data between the first data processing device and the second data processing device, and;

machine readable media to store the instructions.

22. The apparatus of claim 21 wherein the instructions to apply the intermediate clock signal to synchronize data between the first data processing device and the second data processing device further comprises instructions to:

delay a data signal at the first clock frequency by two cycles of the second clock frequency, reclock the data signal at the first clock frequency to the intermediate clock, and, reclock the data signal at the intermediate clock to the second frequency.

23. The apparatus of claim 21 wherein the instruction to apply the intermediate clock signal to synchronize data between the first data processing device and the second data processing device further comprises instructions to:

reclock a data signal at the second clock frequency to the intermediate clock, delay the data signal at the intermediate clock by one cycle of the second clock frequency, and, reclock the data signal at the intermediate clock to the first clock frequency.

24. The apparatus of claim 21 further comprising:

a third data processing device clocked at a third frequency that is an integer fraction of the first clock frequency;

instructions to provide the second clock signal to a second state machine counter, provide a third clock signal having the third frequency to the second state machine counter, apply the second clock signal to reset the second state machine counter to an initial state, increment the second state machine counter with the third clock signal wherein the second state machine counter has an integer number of states equivalent to the ratio of the third clock frequency to the second clock frequency, generate a second intermediate clock signal with the second state machine counter wherein the second state machine counter produces an output signal whenever the state machine increments through all states and returns to the initial state, and, apply the second intermediate clock signal to synchronize data between the second data processing device and the third data processing device, and; machine readable media to store the instructions.

25. The apparatus of claim 24 wherein the instructions to apply the second intermediate clock signal to synchronize data between the second data processing device and the third data processing device further comprise instructions to:

delay a data signal at the second clock frequency by two cycles of the third clock frequency;

reclock the data signal at the second clock frequency to the second intermediate clock frequency; and reclock the data signal at the second intermediate clock frequency to the third frequency.

26. The apparatus of claim 25 wherein data is synchronized between the first data processing device and the third data processing device by first synchronizing data between the first data processing device and the second data processing device then synchronizing the data between the second data processing device and the third data processing device.

27. The apparatus of claim 24 wherein the instructions to apply the second intermediate clock signal to synchronize data between the second data processing device and the third data processing device further comprise instructions to:

reclock a data signal at the third clock frequency to the second intermediate clock;

delay the data signal at the second intermediate clock by one cycle of the third clock frequency; and reclock the data signal at the second intermediate clock to the second clock frequency.

28. The apparatus of claim 27 wherein data is synchronized between the first data processing device and the third data processing device by first synchronizing data between the first data processing device and the second data processing device then synchronizing the data between the second data processing device and the third data processing device.

29. The apparatus of claim 21 wherein the state machine counter generates a precursor intermediate clock signal that is one period of the second clock frequency ahead of the intermediate clock signal.

30. The apparatus of claim 29 further comprising instructions to:

distribute the precursor intermediate clock signal to different locations, latch the precursor intermediate clock signal to a local second clock signal to generate a distributed intermediate clock signal, and, synchronize data at different locations using the distributed intermediate clock signal, and; machine readable media to store the instructions.

* * * * *